Patented Jan. 15, 1929.

1,699,419

UNITED STATES PATENT OFFICE.

KARL ZAHN, OF HOCHST-ON-THE-MAIN, AND PAUL OCHWAT, OF BAD-SODEN, GERMANY, ASSIGNORS TO GRASSELLI DYESTUFF CORPORATION, OF NEW YORK, N. Y., A CORPORATION OF DELAWARE.

PROCESS OF PRODUCING ARYLAMINOANTHRAQUINONES.

No Drawing. Application filed November 23, 1925, Serial No. 71,016, and in Germany December 12, 1924.

We have found that commercially valuable anthraquinone dyestuffs are obtained by heating 5.8-dihalogenquinizarine with primary aromatic bases in presence or absence of an acid-binding agent. Thus, there are, for instance, obtained by treating 5.8-dichloroquinizarine with aniline or with p-toluidine the corresponding dianilido- and ditoluido-dihydroxyanthraquinones. These compounds can be easily converted into sulfonic acids which give on wool very fast and pure yellowish-green dyeings.

We are aware of the statement in "Berichte der deutschen Chemischen Gesellschaft" volume 45, page 1360, according to which by heating 5.8-dichloroquinizarine with aniline in presence of copper powder and potassium carbonate a compound is obtained which is regarded as being dianilidoquinizarine. This compound is stated to be characterized by the property of being soluble in concentrated sulfuric acid to a reddish-violet solution and in alkalies to a blue solution and having its melting point at 245° C.

However, the dianilido compound, obtainable by our new process without using any copper powder, dissolves in concentrated sulfuric acid to a green solution and is insoluble in alkalies; it has its melting point at 258–260° C.

The compound described in the publication above referred to, which is per se obtained with an unsatisfactory yield, contains—if at all—only so small a quantity of a color-base suitable for use that the product is of no commercial value.

Contrary thereto our new process furnishes by an easy reaction and with a yield amounting to over 80 per cent of the theory products of an entirely uniform composition which, without necessitating any further purification, can be converted in the usual manner into dyestuffs.

The following examples serve to illustrate our invention:

(1) 100 parts of 5.8-dichloroquinizarine are heated to 170° C., while stirring, with 500 parts of aniline and 100 parts of anhydrous sodium acetate, until the molten mass has assumed a pure green color which occurs after about 8 hours. To this melt, after it has been allowed to cool to 60° C. are added 500 parts of alcohol and the resulting condensation product is isolated by filtration, washing with alcohol and extraction with dilute hydrochloric acid. The product thus obtained, when crystallized from chlorobenzene, forms dark brilliant needles, which melt at 258–260° C. and dissolve in concentrated sulfuric acid to a pure green solution. The product is insoluble in alkalies. The structure of this product is probably represented by the following graphic formula:—

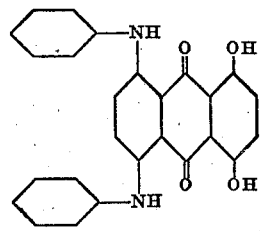

By sulfonating it, for instance by means of sulfuric acid of 66° Bé. at 50° C. a sulfonic acid of the dyestuff is obtained which dyes wool in an acid bath green tints.

(2) Into a melt of 500 parts of p-toluidine are introduced, while stirring, 100 parts of 5.8-dichloroquinizarine and the whole is heated for several hours to 170–180° C. until the molten mass has become pure green. The further operations are carried out as indicated in Example 1, whereby dark blue brilliant needles are obtained which dissolve in concentrated sulfuric acid to a blue solution and fuse at a temperature of over 270° C. The sulfonic acid prepared therefrom in the usual manner gives on wool green dyeings which have a somewhat purer and yellower hue than the dyeings produced from the corresponding anilido compound.

We claim:

1. A process for producing arylaminoanthraquinones which comprises reacting a 5.8-dihalogenquinizarine with a primary aromatic amine by heat and without the addition of copper to the reaction mixture until the reaction mixture assumes a pure green color, and separating the condensation product from the reaction mixture.

2. A process for producing an arylaminoanthraquinone which comprises reacting a 5.8-dihalogenquinizarine with aniline by heat and without the additon of copper to the reaction mixture until the reaction mixture assumes a pure green color, and separating the condensation product from the reaction mixture.

3. A process for producing an arylaminoanthraquinone which comprises reacting a 5.8-dihalogenquinizarine with aniline at a temperature of about 170° C. and without the addition of copper to the reaction mixture until the reaction mixture assumes a pure green color, and separating the condensation product from the reaction mixture.

4. As new products, compositions comprising a derivative of 5.8-dihalogenquinizarine with a primary aromatic amine, said products being soluble in concentrated sulfuric acid to form solutions varying in color from a green to a blue, and being insoluble in alkalies, and having a melting point of between 258 to 270° C.

5. As a new product, a composition comprising a derivative of 5.8-dichloroquinizarine with aniline, said product forming a green solution with concentrated sulfuric acid and being insoluble in alkalies, and having a melting point between 258 to 260° C.

In testimony whereof, we affix our signatures.

KARL ZAHN.
PAUL OCHWAT.